United States Patent Office

2,786,027
Patented Mar. 19, 1957

2,786,027

MODIFIED STARCH CONTAINING DRILLING MUDS HAVING A REDUCED FILTRATION RATE

Richard A. Salathiel, Houston, Tex., assignor, by mesne assignments, to Esso Research and Engineering Company, Elizabeth, N. J., a corporation of Delaware No Drawing. Application September 16, 1955, Serial No. 534,877

16 Claims. (Cl. 252—8.5)

The present invention is directed to a suspension of finely divided solids in an aqueous medium for use in well drilling operations. More particularly, the invention is directed to a drilling mud having a low filtration rate. In its more specific aspects, the invention is directed to a drilling mud to which has been added materials for reducing filtration rate.

The present invention may be briefly described as involving a drilling mud comprising at least 5 percent by weight of finely divided solids in an aqueous saline medium having dissolved therein about 2 to 15 weight percent of salt and to which has been added about 1 to 15 pounds of starch per 42 gallon barrel of mud and about 0.5 to 5 pounds per 42 gallon barrel of mud of an additive having an average molecular weight of about 90 to 3,000 and a ratio of carbon to oxygen of about 1.5 to 2.7, said additive being taken from the group consisting of alkoxy ethers of ethylene and propylene glycol, polyethylene and polypropylene glycols, and alkoxy ethers of polyethylene and polypropylene glycols, said alkoxy radicals of said ethers containing not more than about 6 carbon atoms, said drilling mud containing not more than about 1 pound of alkali metal hydroxide per 42 gallon barrel of mud.

In the rotary method of drilling boreholes, an aqueous suspension of finely divided solids, commonly referred to as a drilling mud, is pumped down the drill stem through the openings in the drill bit and upwardly through the annular space between the drill stem and the wall of the borehole to the surface of the earth. A primary purpose for employing the drilling mud is to pick up the cuttings produced by the drill bit and to transport these cuttings to the surface of the earth. The drilling mud also serves other important functions such as lubricating the bit and the drill stem, cooling the bit, and furnishing a hydrostatic pressure head to prevent flow into the borehole of formation fluid, such as oil, gas, and water, from the various strata penetrated by the drill bit. In certain cases it is highly desirable that the mud form a thin, difficultly permeable coating or filter cake on the walls of the borehole for the purpose of reducing loss of water from the borehole to the formation and thereby reducing softening of the borehole walls and caving into the drill hole. It is perferable that the filter cake formed on the walls of the borehole be thin rather than thick so as to avoid mechanical difficulties in moving the bit in and out of the hole and in placing casing in the hole.

The aqueous suspensions of finely divided solids employed as drilling fluids in rotary drilling operations are sometimes prepared by admixing suitable amounts of commercial clay with water. Heavy materials such as barytes, iron oxide, barium sulfate, calcium carbonate, silica, and the like are often added to such a suspension in order to increase its specific gravity. In many cases, however, the drilling fluid used in oil and gas wells may be obtained by forming a suspension in water of surface clay at or adjacent the well site or may be prepared in the process of drilling by dispersing in water the cuttings produced from the borehole. Weighting materials, clays, and chemicals may, of course, be added to the drilling fluid prepared in the last mentioned manner.

Almost any fluid will perform some of the aforementioned functions, such, for example, as cooling the drill bit, but to perform some of the other functions, it is necessary that the drilling fluid employed possess certain very definite properties. For example, a drilling mud may have sufficient gel strength to prevent settling of solids from the mud when circulation of the mud is stopped, but, at the same time, its other properties may be such as to result in the deposition of a thick filter cake on the borehole walls rather than the preferred thin cake. When large amounts of water filter from the mud into the formations surrounding the borehole, the solids content of the mud remains as a filter cake on the wall of the hole, reducing the size of the annular passage. Sloughing of such a thick filter cake or this together with caving of water-softened borehole wall may cause the drill pipe to become stuck. On the other hand, the employment of a drilling fluid having a low filtration rate restricts to a relatively small amount the water that can escape from the mud under the pressure differential prevailing in the borehole. A small loss of water from the mud to the formation means, of course, that only a thin filter cake will be deposited on the borehole walls. Use of the proper mud will help to preserve the borehole walls intact.

Occasionally, drilling muds which have a relatively low filtration rate may be prepared from borehole cuts; however, it has generally been found necessary to incorporate filtration reducing agents into the mud to impart this desirable property thereto. It is common practice to employ starches for this purpose and, while the addition of starch has proved beneficial, there has been much to be desired in the way of performance, particularly with respect to the reduction of filtration rate when the aqueous medium is an aqueous saline medium.

It is, therefore, an object of the present invention to provide a dispersion or suspension of finely divided solid material in an aqueous saline medium having little tendency to lose water by filtration therefrom. Another object of the present invention is to provide a method for reducing the loss of water from an aqueous saline dispersion or suspension of finely divided solid material. Another object of the present invention is to provide a drilling fluid suitable for use in the rotary drilling of boreholes into subsurface formations and having a low filtration rate. Another object of the present invention is to provide an agent which, on addition to the aqueous saline drilling fluid used in the drilling of boreholes into subsurface formations, will substantially reduce the loss of water therefrom by filtration. A further object of the present invention is to provide an agent which, on addition to a drilling fluid, will substantially reduce the loss of water therefrom by filtration, but which will not increase excessively the viscosity of the fluid or substantially affect its ability to maintain solids in suspension.

The method of the present invention may be briefly described as involving the addition to a mixture, dispersion, or suspension of finely divided solid material in an aqueous saline liquid vehicle having dissolved therein about 2 to 15 weight percent of salt, starch and an additive having an average molecular weight of about 90 to 3,000 and a ratio of carbon to oxygen of about 1.5 to 2.7, said additive being taken from the group consisting of alkoxy ethers of ethylene and propylene glycol, polyethylene and polypropylene glycols, and alkoxy ethers of polyethylene and polypropylene glycols, said alkoxy radicals of said ethers containing not more than about 6 carbon atoms, said drilling mud containing not more than about 1 pound of alkali metal hydroxide per 42 gallon barrel of mud, and said additive being added in an amount sufficient to materially reduce the tendency of the mixture, dispersion or suspension to lose water by filtration. The method of the present invention also comprises the maintenance of proper amounts of starch and additive in the drilling mud during drilling operations in order that the reduced tendency of the drilling mud to lose water may be maintained. By applying the proper amounts of starch and additive, the water lost by filtration from the dispersion or suspension is reduced to a low value.

The composition of the present invention may be described briefly as a mixture comprising an aqueous saline vehicle containing about 2 to 15 weight percent of dissolved salt in which a finely divided solid material is dispersed or suspended and to which has been added starch and an additive having an average molecular weight of about 90 to 3,000 and a ratio of carbon to oxygen of about 1.5 to 2.7, said additive being taken from the group consisting of alkoxy ethers of ethylene and propylene glycol, polyethylene and polypropylene glycols, and alkoxy ethers of polyethylene and polypropylene glycols, said alkoxy radicals of said ethers containing not more than about 6 carbon atoms, said drilling mud containing not more than about 1 pound of alkali metal hydroxide per 42 gallon barrel of mud, said starch and additive having been added in an amount sufficient to substantially reduce the tendency of the composition to lose water by filtration.

The finely divided solid material of the composition of my invention may, of course, be any finely divided solid which is capable of being dispersed or suspended in an aqueous liquid vehicle, and an example of such a dispersion or suspension is the drilling fluid used in rotary drilling of boreholes, which may include various solid materials as hereinbefore indicated.

The finely divided solid material employed in the practice of the present invention will ordinarily include clay, such as colloidal clay bodies. For example, I may use in my drilling mud or aqueous suspension, colloidal clays, such as Wyoming bentonite, El Paso surface clay, medium-yield drilling clays from Texas, clays containing the montmorillonites and especially sodium montmorillonite. The calcium montmorillonite clays may be employed and clays containing other suitable cationic combinations of the montmorillonites may be used. Sodium montmorillonite such as that encountered in Wyoming bentonite is included in the preferred type of clay. I also contemplate that I may use in the practice of my invention muds such as those produced when clayey subsurface formations are drilled. For example, mud obtained from a drilling well in Lake Raccourci in Louisiana may be found entirely suitable. Likewise, I may employ in my invention dried ground shale such as has been obtained from a well in West Cote Blanche Bay in southern Louisiana. To a suitable suspension of colloidal clay of the type exemplified is added a suitable amount of starch and additive. The amount of clay or solids to be used may range from about 5 percent by weight of the mud up to as high as about 75 percent by weight.

The drilling muds of the present invention should also contain starch and an additive having an average molecular weight of about 90 to 3,000 and a ratio of carbon to oxygen of about 1.5 to 2.7, said additive being taken from the group consisting of alkoxy ethers of ethylene and propylene glycol, polyethylene and polypropylene glycols, and alkoxy ethers of polyethylene and polypropylene glycols, said alkoxy radicals of said ethers containing not more than about 6 carbon atoms, said drilling mud containing not more than about 1 pound of alkali metal hydroxide per 42 gallon barrel of mud.

It is to be noted that the additive to be used should have a proper molecular weight (i.e., a molecular weight of 90 to 3,000) and should also have a proper ratio of carbon to oxygen (i.e., 1.5 to 2.7).

Thus, with respect to the ethers of ethylene and propylene glycol there may be used, for example, the dimethyl diether of ethylene glycol (1,2-dimethoxy ethane), the mixed methyl, ethyl diether of ethylene glycol, and the dimethyl diether of propylene glycol.

Polyethylene glycols having the proper ratio of carbon to oxygen for use in accordance with the present invention comprise polyethylene glycols having an average molecular weight of about 150 to 3,000, including triethylene glycol, tetraethylene glycol, a polyethylene glycol having an average molecular weight of about 300, a polyethylene glycol having an average molecular weight of about 600, a polyethylene glycol having an average molecular weight of about 1,000, a polyethylene glycol having an average molecular weight of about 2,000, a polyethylene glycol having an average molecular weight of about 3,000, etc.

The polypropylene glycols to be used in accordance with the present invention having the proper ratio of carbon to oxygen comprise polypropylene glycols having an average molecular weight of about 130 to about 600, including dipropylene glycol, tripropylene glycol, tetrapropylene glycol, a polypropylene glycol having an average molecular weight of about 300, a polypropylene glycol having an average molecular weight of about 600, etc.

A wide variety of ethers of polyethylene glycols may be used which will have the proper ratio of carbon to oxygen. Thus there may be used the dimethyl diether of diethylene glycol, the diethyl ether of diethylene glycol, the mixed methyl, ethyl diether of diethylene glycol, the mixed methyl, n-propyl-diether of diethylene glycol, the mixed methyl, isopropyl-diether of diethylene glycol, etc. Ethers of triethylene glycol that may be used include the dimethyl diether of triethylene glycol, the diethyl diether of triethylene glycol, etc. Representative ethers of tetraethylene glycol include, for example, the dimethyl diether of tetramethylene glycol, the diethyl diether of tetraethylene glycol, the mixed ethyl propyl-diether of tetraethylene glycol, etc. Representative of the ethers of a polyethylene glycol having an average molecular weight of about 600 or more include the dimethyl diether, the diethyl diether, the di-n-propyl diether, the di-isopropyl diether, the dibutyl diether, the dipentyl diether, the dihexyl diether, mixed diethers such as mixed methyl, ethyl diether, the mixed methyl, propyl diether, the mixed pentyl, butyl diether, the mixed hexyl, pentyl diether, etc. There may also be used the dimethyl diether of dipropylene glycol.

Mixtures of two or more additives of the above-described nature may also be used, if desired.

Generally speaking, satisfactory results are obtained through the use of about 1 to 15 pounds of starch and about 0.5 to 5 pounds of additive per 42 gallon barrel of mud. It is to be understood, of course, that the amount of starch and the amount of additive required to give the desired reduction in filtration loss from a suspension of finely divided solids in an aqueous saline liquid vehicle will vary with circumstances over a comparatively wide range, in that the amounts of starch and additive to be employed in a specific suspension or dispersion will depend upon the characteristics of the material to be treated and the circumstances under which it is employed.

The starch and additive may be incorporated into the saline drilling mud in any of the suitable manners known to those skilled in the art. As a specific example of the practice of the present invention it may be desirable to employ aqueous solutions of starch and the additive. The solutions may then be incorporated with the aqueous dispersion or suspension of the finely divided solids. If desired, the starch, or additive, or both, may be directly incorporated in undiluted form in any suitable manner.

When it is desired to reduce the filtration rate of the drilling mud, the materials aforementioned or solutions thereof may be incorporated into the mud at any suitable point in the mud circulation system such as in the mud pit. In some situations it may be desirable to use a mixing device such as a cone and jet mixer or the equivalent thereof for incorporating the starch and additive into the drilling mud.

The present invention may also be considered in connection with the following examples which are given by way of illustration and which are not intended as limitations on the scope of this invention.

EXAMPLE 1

Representative drilling muds were prepared by incorporating clay, in this instance a commercial blend of crude native Texas bentonite (crude calcium montmorillonite) with Wyoming bentonite (sodium montmorillonite) and sodium carbonate into water having dissolved therein five weight percent of salt. There was also incorporated into the drilling muds 1 weight percent of starch. Portions of the thus prepared drilling mud were tested for viscosity, initial gel strength and filtration rate. In addition, representative portions of the drilling mud were modified by the incorporation of about 1 percent by weight of a variety of additives including 1,2-dimethoxy ethane (the dimethyl ether of ethylene glycol), dipropylene glycol, ethylene glycol, polyethylene glycols having average molecular weights of about 200 and 600, respectively, dioxane, and polypropylene glycols having average molecular weights of about 400 and 750, respectively. The thus modified portions of the drilling mud were likewise tested for viscosity, gel strength and filtration rate. The results obtained are set forth in Table I.

*Table I.—Effects of additives on drilling mud*

| Composition | Material Added | Viscosity at 600 R. P. M., cps. stormer | Initial Gel, grams stormer | API Filtration Rate, cc. in 30 min. |
|---|---|---|---|---|
| 1 | None | 32 | 25 | 39.4 |
| 2 | 1,2-Dimethoxy ethane | 28 | 18 | 17.0 |
| 3 | None | 32 | 20 | 37.9 |
| 4 | Dipropylene glycol | 27 | 15 | 19.0 |
| 5 | Ethylene glycol | 28 | 19 | 35.4 |
| 6 | Polyethylene glycol, Mol. Wt. 200 | 28 | 17 | 13.4 |
| 7 | Dioxane | 63 | 60 | 37.9 |
| 8 | None | 25 | 18 | 38.5 |
| 9 | Polypropylene glycol, Mol. Wt. 400 | 63 | 60 | 20.0 |
| 10 | Polypropylene glycol, Mol. Wt. 750 | 58 | 70 | 28.2 |
| 11 | Polyethylene glycol, Mol. Wt. 600 | 32 | 17 | 11.9 |

With respect to compositions 1 and 2 it will be noted that when starch alone was present in the drilling mud a filtration rate of about 39.4 ccs. in 30 minutes was obtained and that this filtration rate was reduced by more than 50% through the addition of 1,2-dimethoxy ethane (composition 2).

With respect to compositions 3 to 7, it will be noted that the drilling mud sample containing only starch had a filtration rate of 37.9 ccs. in 30 minutes and that the addition of ethylene glycol (composition 5) and dioxane (composition 7) did not materially alter the filtration rate. Ethylene glycol has a molecular weight of about 62. It will be noted, however, that the additives of the present invention (the dipropylene glycol of composition 4 and the polyethylene glycol of 200 average molecular weight of composition 6) caused a reduction in filtration rate of about 50% or more.

With respect to compositions 8 to 11, it will be noted that compositions 9 and 11 had a substantially lower filtration rate than the control composition 8 which contained only starch, whereas composition 10 (polypropylene glycol 750) did not give a substantially materially lowered filtration rate. Polypropylene glycol molecular weight 400 will have an average ratio of carbon to oxygen of about 2.6 whereas polypropylene glycol of molecular weight 750 will have a ratio of carbon to oxygen of about 2.8, which is outside the scope of the present invention.

EXAMPLE 2

A representative drilling mud was prepared as in Example 1 with but one exception, namely, the addition of 0.5 rather than 1% of sodium carbonate. That is to say, a mud composition was prepared comprising 20 weight percent of the commercial clay of Example 1 in 80 weight percent of an aqueous saline medium containing 5 weight percent of dissolved salt with 0.5% of sodium carbonate and 1% of starch added to the suspension.

A portion of the thus prepared mud was tested for viscosity, gel strength and filtration rate. To other portions of the mud there was added 1, 2 and 4 pounds per barrel of polyethylene glycol having an average molecular weight of 600 and the thus modified portions were likewise tested for viscosity, gel strength and filtration rate. The results are set forth in Table II.

*Table II.—Effects of polyethylene glycol, mol. wt. 600, on properties of a salt-water mud containing ½% Na₂CO₃ and 1% starch*

| Composition | Amount of Polyethylene Glycol Added to Stock Mud, Lb./Bbl. | Viscosity at 600 R. P. M., cps. Stormer | Initial Gel, Grams Stormer | API Filtration Rate, cc. in 30 Min. |
|---|---|---|---|---|
| 12 | 0 | 39 | 30 | 33.9 |
| 13 | 1 | 41 | 33 | 18.2 |
| 14 | 2 | 42 | 35 | 10.3 |
| 15 | 4 | 43 | 37 | 7.9 |

From Table II it will be seen that the viscosity and gel strength are not adversely affected through the addition of various amounts of polyethylene glycol whereas the filtration rate was progressively reduced as the amount of added polyethylene glycol was increased.

EXAMPLE 3

As another example, a drilling mud composition was prepared containing 20 weight percent of the commercial clay of Example 1, 80 weight percent of sea water (which contained about 3.5 weight percent of dissolved salt), 0.5 percent of sodium carbonate and 1 percent of starch. One portion of the thus prepared drilling mud was tested without modification and another portion of the drilling mud was tested after the addition thereto of about 2 pounds per barrel of polyethylene glycol having an average weight of about 600. The results obtained are set forth in Table III.

*Table III.—Effects of polyethylene glycol, mol. wt. 600, on properties of a sea-water mud*

| Composition | Amount of Polyethylene Glycol of Mol. Wt. 600: Lb./Bbl. | Viscosity, cps. | Initial Gel, grams | Filtration Rate, cc. API |
|---|---|---|---|---|
| 16 | 0 | 40 | 33 | 33.4 |
| 17 | 2 | 41 | 37 | 9.7 |

EXAMPLE 4

The desired reduction in filtration rate is not obtained in accordance with the present invention when the additives of the present invention are added to drilling muds in the absence of starch. As an example, a drilling mud was prepared containing 22 weight percent of the commercial clay of Example 1 and 78 weight percent of an aqueous saline medium containing 5 weight percent of dissolved salt. One portion of the thus prepared composition was tested without modification and to other portions of the composition there was added 1, 2, 4 and 8 pounds per barrel, respectively, of a polyethylene glycol having an average molecular weight of 300. The added polyethylene glycol had no material effect on filtration rate as is shown by the results that were obtained, which are set forth in Table IV.

*Table IV.—Effects of polyethylene glycol, mol. wt. 300, additions on properties of drilling muds in absence of starch*

| Composition | Material Added, Polyethylene Glycol, Mol. Wt. 300, Lb./Bbl. | Viscosity | Initial Gel | Filtration Rate |
|---|---|---|---|---|
| 18 | 0 | 9.0 | 8 | 48.3 |
| 19 | 1 | 9.0 | 8 | 48.4 |
| 20 | 2 | 9.0 | 8 | 48.7 |
| 21 | 4 | 9.0 | 8 | 46.6 |
| 22 | 8 | 9.0 | 8 | 47.6 |

EXAMPLE 5

As has been indicated, the drilling mud of the present invention should not contain more than about 1 pound of alkali metal hydroxide per 42 gallon barrel of mud. As an example, a drilling mud was prepared containing 20 weight percent of the commercial clay of Example 1, 80 weight percent of a saline medium containing about 5 weight percent of dissolved salt, with about 0.5 percent of sodium carbonate and about 1 percent of starch added to the suspension. A portion of the thus prepared composition was tested without modification and various amounts of sodium hydroxide and polyethylene glycol having an average molecular weight of about 300 were added to other portions of the drilling mud which were then tested. The compositions prepared and results obtained are set forth in Table V.

*Table V.—Effects of NaOH and polyethylene glycol, mol. wt. 300, additions to a drilling mud*

| Composition | Materials Added to Stock Mud | | Viscosity | Initial Gel | Filtration Rate |
|---|---|---|---|---|---|
| | NaOH[1] Lb./Bbl. | Polyethylene Glycol, Mol. Wt. 300, Lb./Bbl. | | | |
| 23 | 0 | 0 | 22.0 | 12 | 66.0 |
| 24 | .25 | 0 | 26.5 | 23 | 65.6 |
| 25 | .5 | 0 | 30.0 | 20 | 52.0 |
| 26 | 1.0 | 0 | 27.5 | 13 | 53.0 |
| 27 | 0 | 4 | 24.3 | 13 | 9.7 |
| 28 | .25 | 4 | 27.5 | 16 | 10.5 |
| 29 | .5 | 4 | 28.5 | 11 | 21.4 |
| 30 | 1.0 | 4 | 27.0 | 5 | 42.0 |

[1] Added as a 40% aqueous solution.

From Table V it will be seen that the addition of 0.25, 0.5 and 1.0 pounds per barrel of sodium hydroxide (compositions 24 to 26, respectively) had no substantial effect on the filtration rate as compared with the control composition 23. It will also be noted that with respect to composition 27 with addition of 4 pounds per barrel of polyethylene glycol in the absence of sodium hydroxide caused about an 85 percent reduction in filtration rate. The addition of about 0.25 pound per barrel of sodium hydroxide (composition 28) did not materially affect filtration rate and, with the addition of 0.5 pound per barrel of sodium hydroxide (composition 29) the results were still satisfactory in that the filtration rate was substantially materially below the filtration rate obtainable without the addition of polyethylene glycol. With respect to composition 30, it is seen that the addition of about 1 pound per barrel of sodium hydroxide caused a still further increase in the filtration rate, as compared with composition 29, thus indicating that the beneficial reduction of filtration rate obtained with the additives of the present invention is largely lost when more than about 1 pound per 42 gallon barrel of sodium hydroxide or other alkali metal hydroxide is present in the drilling mud.

The nature and objects of the present invention having been fully described and illustrated, what is claimed is:

1. A drilling mud comprising at least 5 percent by weight of finely divided solids in an aqueous saline medium containing about 2 to 15 weight percent of dissolved salt to which has been added from about 1 to 15 pounds of starch per 42 gallon barrel of mud and from about 0.5 to 5 pounds per 42 gallon barrel of mud of an additive having an average molecular weight of about 90 to 3,000 and a ratio of carbon to oxygen of about 1.5 to 2.7, said additive being taken from the group consisting of alkoxy ethers of ethylene and propylene glycol, polyethylene and polypropylene glycols, and alkoxy ethers of polyethylene and polypropylene glycols, said alkoxy radicals of said ethers containing not more than about 6 carbon atoms, said drilling mud containing not more than about 1 pound of alkali metal hydroxide per 42 gallon barrel of mud.

2. A drilling mud as in claim 1 wherein the additive is an alkoxy ether.

3. A drilling mud as in claim 2 wherein the ether is 1,2-dimethoxy ethane.

4. A drilling mud as in claim 1 wherein the additive is a polyethylene glycol.

5. A drilling mud as in claim 4 wherein the polyethylene glycol is a polyethylene glycol having an average molecular weight of about 200 to 600.

6. A drilling mud as in claim 1 wherein the additive is a polypropylene glycol.

7. A drilling mud as in claim 6 wherein the polypropylene glycol is a dipropylene glycol.

8. A drilling mud as in claim 7 wherein the polypropylene glycol is a polypropylene glycol having an average molecular weight of about 400.

9. In a process for drilling a well with well drilling tools in which there is circulated in the well a water based drilling mud containing at least about 5 percent by weight of finely divided solids, said water base containing about 2 to 15 percent of dissolved salt, a method of forming a filter cake on the wall of said well to decrease the loss of water into a permeable formation penetrated by said well which comprises incorporating into said drilling mud from about 1 to 15 pounds of starch per 42 gallon barrel of mud and from about 0.5 to 5 pounds per 42 gallon barrel of mud of an additive having an average molecular weight of about 90 to 3,000 and a ratio of carbon to oxygen of about 1.5 to 2.7, said additive being taken from the group consisting of alkoxy ethers of ethylene and propylene glycol, polyethylene and polypropylene glycols, and alkoxy ethers of polyethylene and polypropylene glycols, said alkoxy radicals of said ethers containing not more than about 6 carbon atoms, said drilling mud containing not more than about 1 pound of alkali metal hydroxide per 42 gallon barrel of mud, said starch and said additive being incorporated in amounts sufficient to substantially lower the filtration rate of said mud and contacting said wall of said well with said thus-modified drilling mud to form said filter cake thereon.

10. A process as in claim 9 wherein the additive is an alkoxy ether.

11. A process as in claim 10 wherein the ether is 1,2-dimethoxy ethane.

12. A process as in claim 9 wherein the additive is a polyethylene glycol.

13. A process as in claim 12 wherein the polyethylene glycol is a polyethylene glycol having an average molecular weight of about 200 to 600.

14. A process as in claim 9 wherein the additive is a polypropylene glycol.

15. A process as in claim 14 wherein the polypropylene glycol is dipropylene glycol.

16. A process as in claim 14 wherein the polypropylene glycol is a polypropylene glycol having an average molecular weight of about 400.

References Cited in the file of this patent

UNITED STATES PATENTS

| | | |
|---|---|---|
| 2,209,591 | Barnes | July 30, 1940 |
| 2,271,696 | Jones | Feb. 3, 1942 |
| 2,399,986 | Chapman | May 7, 1946 |
| 2,589,949 | Meadors | Mar. 18, 1952 |